United States Patent [19]

Verboom et al.

[11] Patent Number: 5,142,514
[45] Date of Patent: Aug. 25, 1992

[54] APPARATUS AND METHOD FOR VERIFICATION OF DATA ESTABLISHED ON A RECORD CARRIER DURING WRITE

[75] Inventors: Johannes J. Verboom, Black Forest; Daniel J. Driscoll, Colorado Springs, both of Colo.

[73] Assignee: North American Philips Corporation, New York, N.Y.

[21] Appl. No.: 428,106

[22] Filed: Oct. 27, 1989

[51] Int. Cl.⁵ .................................................. G11B 7/00
[52] U.S. Cl. ........................................ 369/30; 369/54; 369/58; 369/59; 360/53
[58] Field of Search ............ 369/30, 53, 54, 57, 369/58, 14, 15, 100, 107, 111, 116, 178; 346/76 L; 360/53; 358/342

[56] References Cited

U.S. PATENT DOCUMENTS 4,363,116 12/1982 Kleuters et al. ................. 358/342

Primary Examiner—Roy N. Envall, Jr.
Assistant Examiner—Hung T. Dang
Attorney, Agent, or Firm—David R. Treacy

[57] ABSTRACT

The present invention provide an apparatus and method for verifying that a record carrier has been transformed from a first state to a second state in accordance with the state of a binary information signal being recorded thereon. In operation, the apparatus detects the signal generated by the record carrier during the supposed transformation and compares this signal to the corresponding portion of the binary information signal to determine whether or not the transformation has taken place, i.e., verifies the transformation. The present invention, in one embodiment, is employed in an optical disk system.

23 Claims, 3 Drawing Sheets

APPARATUS AND METHOD FOR VERIFICATION OF DATA ESTABLISHED ON A RECORD CARRIER DURING WRITE

FIELD OF THE INVENTION

The present invention relates to the verification of data established on a record carrier.

BACKGROUND OF THE INVENTION

Digital computer systems operate on a binary information signal that, at any point in time, is in either a low state or a high state, with the exception of the time during which a transition is made between the low state and the high state. The smallest unit of time within which the binary information signal must be in either a low state or a high state and the basic unit of information is known as a bit. Eight consecutive bits constitute what is known as a byte of information.

Digital computer systems typically employ a record carrier, such as an optical disk, to store binary information for future use. Binary information is stored or written on the record carrier by changing the state of the record carrier from a first state to a second state in accordance with a change in the state of the binary information signal. For example, an optical disk is typically in a reflective state before any information is written thereon. A binary information signal is written or recorded on the optical disk by changing the reflectivity of the optical disk from the reflective state to a non-reflective state in accordance with a change in the state of the binary information signal from its low state to a high state. The change in the state of the optical disk is achieved by increasing the intensity of a laser beam to a point where it removes the reflective surface of the optical disk to form a non-reflective pit. When the binary information signal returns from the high state to the low state, the intensity of the laser beam is reduced to a point where the reflective surface of the optical disk is unaffected. In this fashion, a binary information signal can be recorded on an optical disk.

Record carriers are subject to recording errors where the state of the record carrier is not changed in accordance with a change in the state of the binary information signal. For example, if the laser malfunctions in an optical disk system the necessary pit may not be established on the optical disk when the information signal changes from a low state to a high state.

Record carriers are also subject to media defects that may alter the meaning of the binary information signal recorded on the record carrier. For example, the reflective surface of an optical disk may be pitted at an inappropriate location. If the pit occurs at a location which corresponds with the state of the binary information recorded thereon, then the media defect is of no consequence. If, however, the pit occurs at a location that does not correspond to the state of the binary information signal, then the media defect has created an error.

To determine if there is a recording error or a media defect on a record carrier, the binary information signal is compared to the information established on the record carrier. A known method, employed in magnetic and optical disks, of detecting recording errors and media defects is to write the binary information on the disk during a first revolution of the disk, read the binary information established on the disk during a second revolution of the disk and then compare the "write" binary information to the "read" binary information. If the "write" binary information and the "read" binary information on the disk are not equivalent, then there is either a recording error or media defect. While this method does detect recording errors and/or media defects on the record carrier, the need to write information during a first revolution and read information during a second revolution leads to a low recording rate or throughput. To increase the throughput, known optical disk systems have compared the signal generated by the optical record carrier immediately after a pit has supposedly been established on the optical disk to the corresponding bit of the binary information signal. Exemplary of such an optical disk system is U.S. Pat. No. 4,363,116 which issued to Kleuters, et al., on Dec. 7, 1982, for a "Method, Apparatus, and Record Carrier Body for Optically Writing Information" and is assigned to the majority partner of the assignee of the present invention. In Kleuters, et al., the intensity of the laser beam is increased in accordance with a change in the state of the binary information signal from a low state to a high state. This increase in intensity supposedly establishes a pit in the optical disk. Upon a transition of the write binary information signal from the aforementioned high state to a low state, the intensity of the laser beam is decreased to a point where the reflective surface of the optical disk is unaffected and interaction of the laser beam with the surface of the optical disk produces a signal indicative of the state of the optical disk. Even though the laser beam is now positioned at a point following the pit due to the rotation of the optical disk, the spot size of the laser beam is large enough to interact with the pit and produce a signal known as a pip. The pip is compared to the high state of the binary information signal to verify that the bit or bits of the information signal in the high state have been properly recorded on the optical disk.

Presently, the speed at which information is recorded on optical record carriers, i.e., the data transfer rate, has increased to the point where the aforementioned pip can no longer be used to verify that a pit has been established on the optical disk in accordance with the state of the binary information signal. At least one reason that the pip can no longer be used is the low bandwidth of the preamplifier employed in the read circuitry relative to the bandwidth of the reflected write pulse. High bandwidth preamplifiers are available to remedy this problem. However, such amplifiers are presently difficult to implement and very expensive. The photo-detectors employed in the read circuitry also exhibit a low bandwidth relative to the bandwidth of the reflected write pulse. It is, however, desirable that a high throughput be maintained. Consequently, there is a need for a method and apparatus to verify that a record carrier has been transformed from a first state to a second state in accordance with a binary information signal while also providing a high throughput in a recording system with a high data transfer rate. It is also desirable that the needed method and apparatus employ a relatively low bandwidth preamplifier and photo-detector in the read circuitry.

SUMMARY OF THE INVENTION

The present invention verifies that a record carrier has been transformed from a first state to a second state in accordance with the change of state of a binary information signal by detecting the signal generated by the record carrier during transformation of the record carrier and comparing this signal to the corresponding portion of the binary information signal. The preferred embodiment of the present invention is employed in an optical disk system having an optical record carrier that can be transformed from a reflective state to a non-reflective state. The present invention further includes a device for providing the binary information signal to be recorded on the optical record carrier. A laser device whose intensity is modulated in accordance with the state of the binary information signal is used to transform the record carrier from the reflective state to the non-reflective state in accordance with the binary information signal. A detector is employed to detect the signal produced by the optical record carrier during the aforementioned transformation. The present invention also includes a device for comparing the signal produced by the optical record carrier during transformation to the corresponding portion of the binary information signal to verify the transformation, i.e., determine whether or not a recording error has occurred.

By using the signal produced by the record carrier during transformation, rather than the signal produced after transformation, the present invention can be employed to detect recording errors in situations where there is a high recording rate without affecting throughput. Moreover, the present invention can be used to detect recording errors using a low bandwidth preamplifier and photo-detector in the read circuitry.

DETAILED DESCRIPTION OF THE PREFERRED EMBODIMENT

The present invention provides an apparatus and method for verifying that a record carrier has been changed from a first state to a second state in accordance with a change in a binary information signal. In operation, the present invention detects a signal produced by the record carrier during transformation of the record carrier from a first state to a second state in accordance with a binary information signal. The signal is compared to the corresponding portion of the binary information signal to determine if a recording error, i.e., where the record carrier has not changed from the first state to the second state in accordance with the binary information signal, has occurred.

Figure 1:
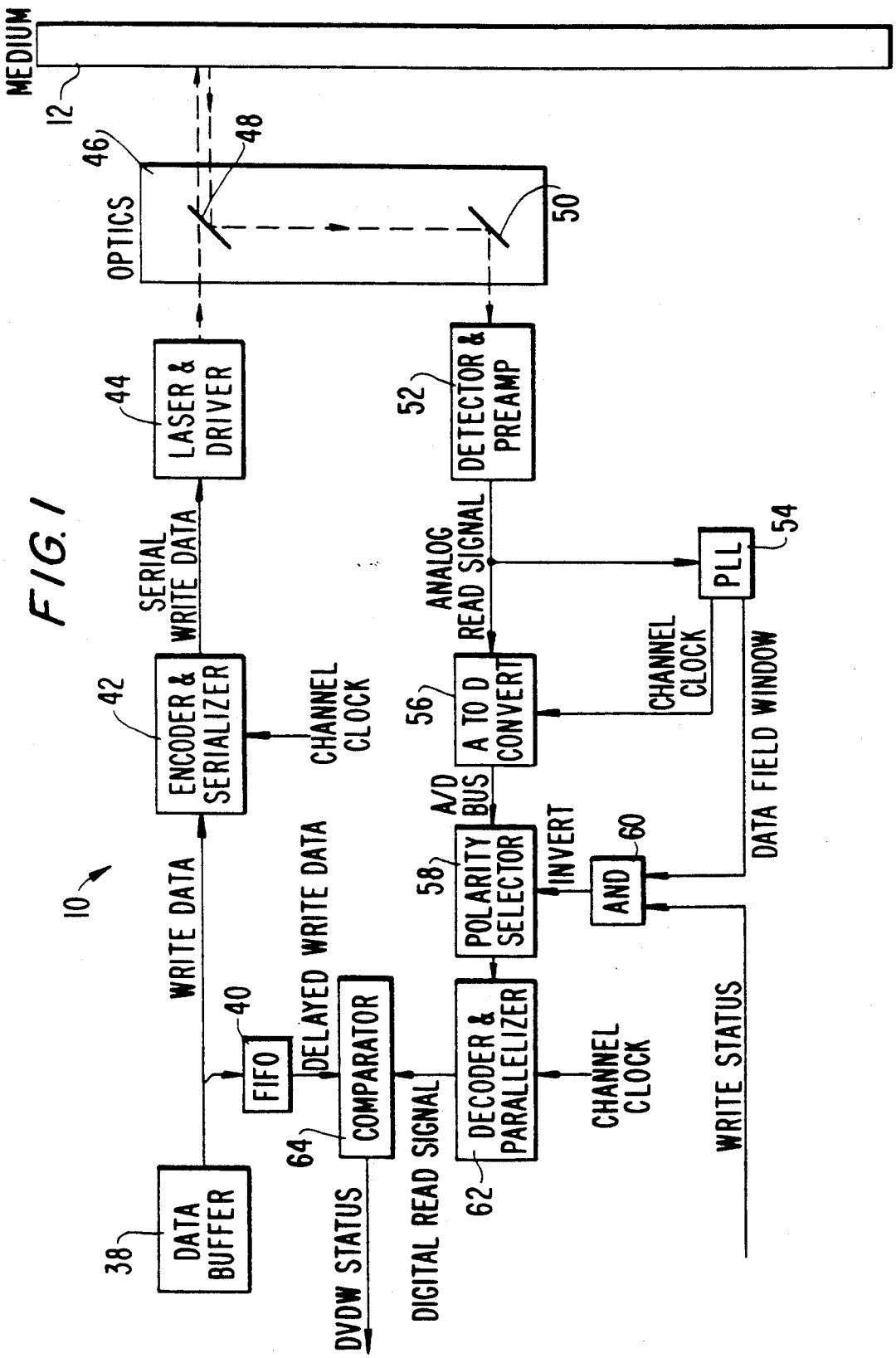
FIG. 1 is a block diagram of the preferred embodiment of the invention.
Figure 2:
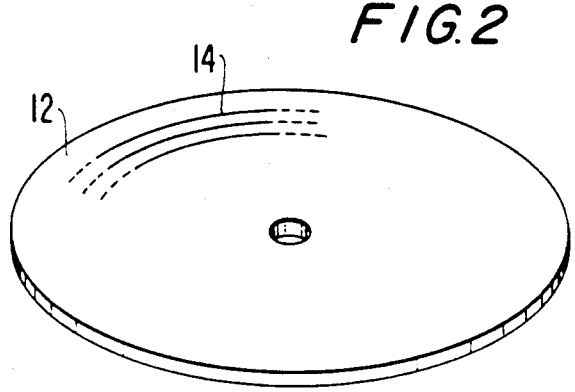
FIG. 2 illustrates an optical disk employed in the preferred embodiment of the invention.
Figure 3:
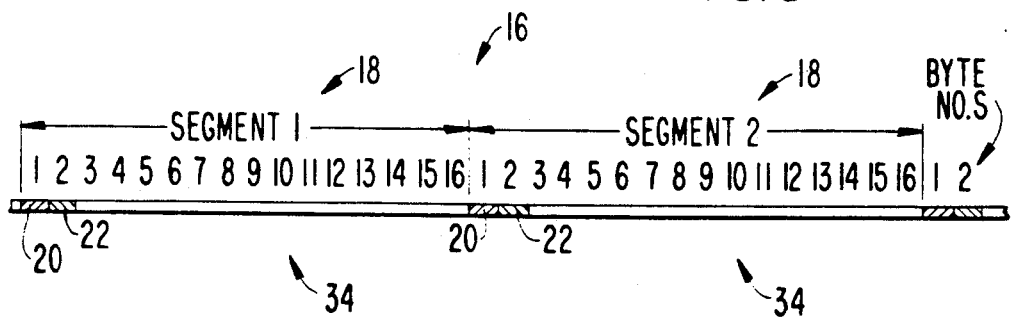
FIG. 3 illustrates the preferred track format, including servo areas and a data area, employed in the optical disk illustrated in FIG. 2.
Figure 4:
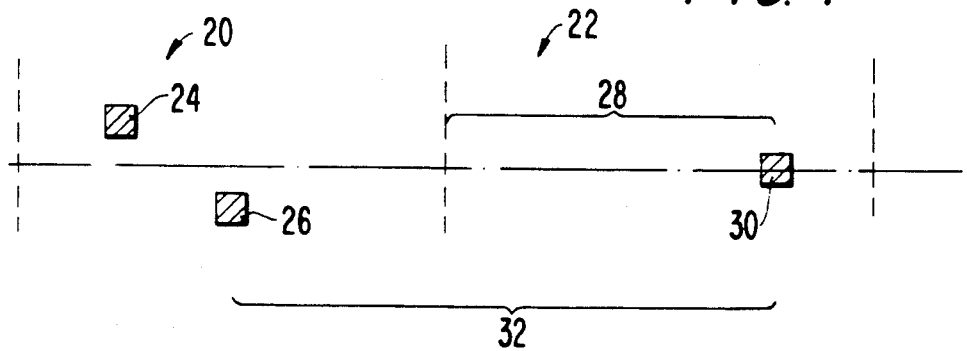
FIG. 4 illustrates the preferred format of the servo areas mentioned in FIG. 3.

The preferred embodiment of an apparatus for verifying the recording of data on a record carrier during write 10, hereinafter apparatus 10, is illustrated in FIG. 1. With reference to FIGS. 2–4, the apparatus 10 includes an optical disk 12 having one or more concentric or spiral tracks 14 for storing binary information. The track 14 is divided into a number of sectors. Each sector includes a sector header area (not shown) that provides address information and a user data area 16 for storing the user's binary information. Preferably, the binary information to be written on the record carrier is provided in the form of bytes of information. The user data area 16 is divided into a number of segments 18. Each segment 18 includes a first servo byte 20 and a second servo byte 22 that provide servo information, such as tracking information, and cannot be used to store the user's binary information. The first servo byte includes a first wobbled pit 24 and second wobbled pit 26 that are primarily used to generate a radial tracking signal. The second servo byte 22 includes a mirror area 30 that is used to produce servo information. Further included in the second servo byte is a timing pit 30 that is used to correct a clock signal that is, in turn, used to coordinate the operation of the apparatus 10. The timing pit 30 is also a defined distance from the end of the second servo byte. The first and second servo bytes 20, 22, are distinguished from the user data area 16 by a unique distance 32 separating the second wobbled pit 26 and the timing pit 30. Each segment 18 further includes a number of user data bytes 34 that are used to store the user's binary information. Preferably, before a byte of the user's binary information has been recorded thereon, each user data byte is in a reflective state throughout its entire extent. To record or write a byte of the user's binary information in a user data byte, the user data byte is transformed from its reflective state to its non-reflective state in accordance with the state of the bits within each byte of the user's binary information. For example, suppose a byte of the user's binary information includes a first low bit, a second high bit and a third low bit sequence. Further suppose that the reflective state of the optical disk 12 corresponds to the low state of the user's binary information and the non-reflective state of the optical disk 12 corresponds to the high state of the user's binary information. In this case, the aforementioned sequence is established on the optical disk 12 by first allowing the optical disk to remain in its reflective state for a bit unit of time in accordance with the first low bit, then transforming the optical disk 12 from its reflective state to its non-reflective state for a bit unit of time in accordance with the second high bit and then allowing the optical disk 12 to remain in its reflective state for a bit unit of time in accordance with the third low bit. An optical disk that is transformed from a non-reflective state to a reflective state is also feasible.

The apparatus 10 further includes a data buffer 38 that provides the bytes of binary information that are to be written on the optical disk 12. In the preferred embodiment of the apparatus 10, the high bits of the binary information signal output by the data buffer 38 are positive relative to the low bits, i.e., the binary information signal has a positive polarity. Hereinafter, the binary information signal output by the data buffer 38 is referred to as the write data. Each byte of the write data output by the data buffer 38 is provided by a parallel data bus to a fifo buffer 40 that stores the byte for later comparison with the corresponding byte established on the optical disk 12. Each byte of the write data output by the data buffer 38 is also provided by the parallel data bus to an encoder/serializer 42 that converts the eight-bit byte of information to a fifteen bit "byte" according to a 4/15 modulation code. The encoder/serializer 42 also changes the byte from parallel format to a serial format and maintains the aforementioned positive polarity of the binary information. The encoded and serialized byte or bytes output by the encoder/serializer 42 are hereinafter referred to as the serial write data.

The operation of the encoder/serializer 42 is coordinated according to a channel clock.

The apparatus 10 also includes a laser/driver device 44 that produces a laser beam modulated in accordance with the state of the serial write data output by the encoder/serializer 42. In the preferred embodiment of the apparatus 10, the intensity of the laser beam produced by the laser/drive apparatus 44 is at a low level when the serial write data is in a low state and is at a high level when the serial write data is in a high state. When the laser beam produced by the laser/drive apparatus 44 is at a low level it will not cause a change in the state of the optical disk 12. When, however, the laser beam is at a high intensity, it will change the state of the optical disk 12 from its reflective state to its non-reflective state by pitting or removing the reflective surface of the optical disk 12.

The apparatus 10 further includes optics 46 for directing the laser beam produced by the laser/driver 44 to the optical disk and directing any signal reflected from the optical disk 12 to a detector. The optics 46 includes a first mirror 48 that allows the laser beam produced by the laser/driver 44 to pass through and interact with the optical disk 12, while reflecting any signal reflected from the optical disk to a second mirror 50. The second mirror 50, in turn, operates to direct the signal reflected from the optical disk 12 to a detector.

Also included in the apparatus 10 is a detector/preamp 52 that detects the optical signal reflected from the optical disk 12 and converts it to an analog signal. Hereinafter, the analog signal is referred to as the analog read signal since it is representative of the information on the optical disk. The analog read signal produced by the detector/preamp 52 when the laser beam is at its low intensity level also has a positive polarity. Specifically, the portion of the analog read signal that corresponds to a portion of the optical disk 12 that is in a non-reflective state (a pit) is positive relative to the portion of the analog read signal that corresponds to a portion of the optical disk 12 that is in a reflective state. However, the analog read signal produced by the detector-preamp 52 when the laser beam is at its high intensity, i.e. when a portion of the optical disk is being changed from its reflective state to its non-reflective state in accordance with the high state of the serial write data, has a negative polarity. Specifically, the analog read signal during transformation of the optical disk 12 is negative relative to the analog read signal produced when the laser beam is at its low intensity. The preamp portion of the detector/preamp 52 has a low bandwidth relative to the signal produced by the optical disk 12. Consequently, the preamp is incapable of following rapid transitions in the optical signal reflected from the optical disk 12, such as the rapid transitions in a pip.

The analog read signal produced by the detector/preamp 52 is applied to a phase-locked loop 54 which detects, at least initially, the timing pit 30 in the second servo byte 22 based on the unique distance 32 between the second wobbled pit 26 and the timing pit 30. The phase-locked loop 54 utilizes the timing pit 30 to correct a channel clock that is used to coordinate the operation of various elements in the apparatus 10. The phase-locked loop 54 also utilizes the timing pit 30, together with the defined distance separating it from the end of the second servo byte 22, to generate a data field window signal that indicates the end of the first and second servo bytes 20, 22, and the beginning of the user data bytes 34.

The analog read signal is also applied to an A/D converter 56 that converts the analog read signal to a digital read signal. The operation of the A/D converter 56 is coordinated by the channel clock generated by the phase-locked loop 54.

The apparatus 10 further includes a polarity selector 58 that reverses the polarity of the digital read signal output by the A/D converter 56 during write so that the polarity of the write data is the same as the polarity of the digital read signal. As previously mentioned, the write data has a positive polarity and the digital read signal during write, i.e., when the laser beam is at its high intensity, has a negative polarity. Consequently, before the write data output by the data buffer 38 can be compared to the digital read signal, the polarity of one or the other must be reversed. The operation of the polarity selector 58 is controlled by an AND gate 60 having as inputs a write status signal and the data field window signal generated by the phase-locked loop 54. The write status signal, when set, indicates that the apparatus 10 is going to write or is writing information in the user data bytes 34. The data field window signal, when set, indicates that the laser beam is positioned over the user data bytes 34. When both the write status signal and the data field window signal are set, an invert signal output by the AND gate 60 enables the polarity selector 58 which, in turn, reverses the polarity of the digital read signal.

The apparatus 10 also includes a decoder 62 that demodulates, i.e., reverses the 4/15 coding done by the encoder/serializer 42, the polarized digital read signal output by the polarity selector 60. The operation of the decoder 62 is coordinated by the channel clock produced by the phase-locked loop 54.

Also included in the apparatus 10 is a comparator 64 that compares the byte stored in the fifo 40 to the corresponding byte read from the optical media. If the aforementioned bytes do not correspond, then the comparator 64 sets a status signal indicating an error. Otherwise, the comparator 64 resets the status signal.

Figure 5:
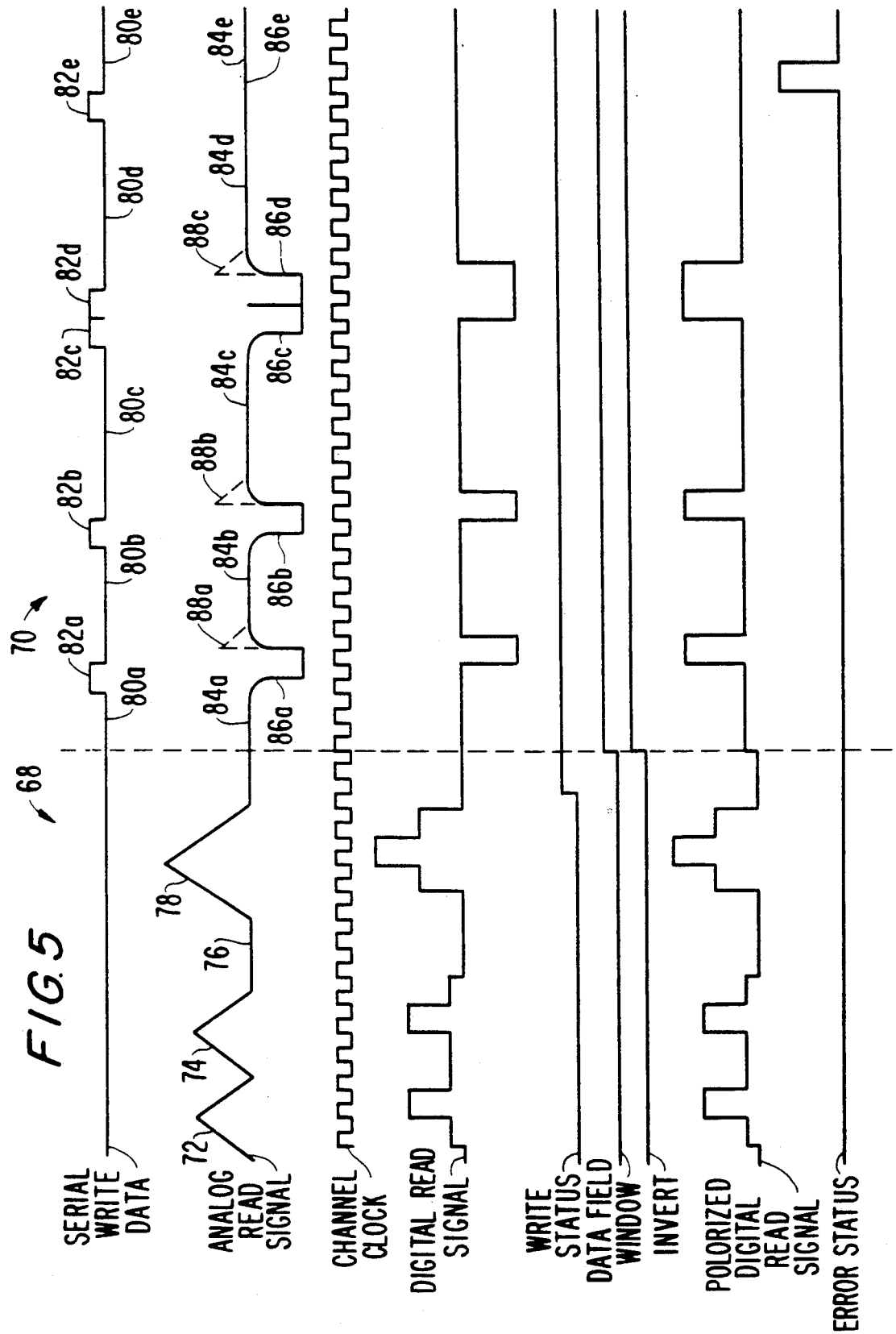
FIG. 5 is a timing diagram that illustrates the operation of the preferred embodiment of the invention illustrated in FIG. 1.

With reference to FIG. 5, the operation of the apparatus 10 is hereinafter described. FIG. 5 illustrates the various signals produced by the apparatus 10 during a first time 68 when the laser beam is positioned over the first and second servo bytes 20, 22 and during a second time 70 when a byte of user information is being written in one of the user data bytes 34.

During the first time 68, the serial write data signal is in a low state. Consequently, the laser beam produced by the laser/drive 44 is correspondingly at its low intensity level and can be used to read the first and second servo bytes 20, 22. The analog read signal includes a first peak 72 that corresponds to the signal produced by the first wobbled pit and a second peak 74 that corresponds to the signal produced by the second wobbled pit. The first and second peaks 72, 74, are used to generate radial tracking signal. The analog read signal further includes a flat portion 76 that corresponds, at least in part, to the signal produced by the mirror area 28. The flat portion 76 is used to generate servo information. Also included in the analog read signal is a third peak 78 that corresponds to the signal generated by the timing pit 30. The third peak 78 is used to synchronize the channel clock produced by the phase-locked loop 54. Also illustrated is the digital read signal that is produced by the A/D converter 56 in response to the portion of the analog read signal including the first, second and third peaks 72, 74, 78 and the flat portion 76. During the first time 68, the data field window signal is reset thereby disabling the polarity selector 58. Consequently, the digital read signal produced by the A/D converter 56 is directly applied to the decoder 62.

With respect to the second time 70, the serial write signal includes a byte of information having several low bits 80a–80e. Also included in the serial write data signal are five high bits 82a–82c. The laser beam produced by the laser/driver 44 in response to the low bits 80a–80e, is of an intensity that does not cause a change in the state of the optical disk 12. Conversely, the intensity of the laser beam produced by the laser/driver 44 in response to the five high bits 82a–82e is at a level at which the optical media is changed from its reflective state to a pitted, non-reflective state.

When the laser is at its low intensity level, i.e., during bits 80a–80e of the serial write data signal, the laser beam is reflected from the optical disk 12 to the detector/preamp 52 by the first and second mirrors 48, 50. The detector/preamp 52, in turn, generates portions 84a–84e of the analog read signal. When the laser beam is at its high intensity, i.e., during bits 82a–82d of the serial write data signal, the optical disk 12 is transformed from its reflective state to its non-reflective state and produces signals that are reflected to the detector/preamp 52 by the first and second mirrors 48, 50. The detector/preamp 52, in turn, produces portions 86a–86d of the analog read signal. Notably, portions 86a–86d of the analog read signal are of an opposite polarity from the corresponding serial write data. A portion 86e of the analog read signal which should indicate a change of state in the optical disk 12 in accordance with the bit 82e of the serial write data signal does not do so in order to illustrate the operation of the apparatus 10 when there is a recording error. Also illustrated in the analog read signal are pips 88a–88c which have previously been used to verify the transformation of the optical disk 12 from a first state to a second state. However, due to the increased data transfer rate, the bandwidth of the pip is such that the preamp portion of the detector/preamp 52 can no longer detect the pips 88a–88c. Consequently, the pips 88a–88c are illustrated by dashed lines.

The analog read signal produced by the detector/preamp 52 is applied to the A/D converter 56 which generates the digital read signal. The digital read signal is applied to the polarity selector 58 which, during the writing of information on the optical disk 12, is enabled by the AND gate 60. The polarity selector 58 reverses the polarity of the digital read signal so that it corresponds to the polarity of the write signal. The polarized digital read signal output by the polarity selector 58 is input to the decoder 62 which reverses the 4/15 encoding done by the encoder/serializer 42. Consequently, an 8-bit digital read signal is output by the decoder 62. This 8-bit digital read signal is applied to the comparator 64. The comparator 64 compares the byte of write data stored in the fifo buffer 40 to the byte of digital read signal output by the decoder 62. If a high bit of the write data corresponds to a high bit of the digital read signal, then it can be concluded that the state of the optical disk 12 has been changed from a reflective state to a non-reflective state in accordance with the write data. If, however, there is not a high bit in the digital read signal that corresponds to a high bit in the write signal, then there is a recording error and the error status line output by the comparator 64 is set. For instance, the error status signal is set when the apparatus failed to produce a pit in the optical disk 12 in accordance with bit 82e.

Several variations of the preferred embodiment of the apparatus 10 are possible without departing from the scope of the present invention. For instance, the present invention can be used in systems that use other forms of optical media, such as optical tape. The present invention can also be used in systems that employ other types of record carriers, such a magnetic disks. Furthermore, changes in the polarity of various signal can be accommodated. For example, the polarity of the write data signal, rather than the read data signal, can be changed. Alternatively, the polarity of the read data can be changed by employing a record carrier having opposite characteristics from the illustrated record carrier. In addition, the present invention can be used with a record carrier that produces signals all of one polarity.

The foregoing description of the invention has been presented for purposes of illustration and description. Further, the description is not intended to limit the invention to the form disclosed therein. Consequently, variations and modifications commensurate with the above teachings, and the skill and knowledge of the relevant art are within the scope of the present invention. For instance, the preferred embodiment described hereinabove is further intended to explain the best mode known of practicing the invention and to enable other skill in the art to utilize the invention in various embodiments and with the various modifications required by their particular applications or uses of the invention. It is intended that the appended claims be construed to include alternative embodiments to the extent permitted by the prior art.

What is claimed is:

1. An apparatus for use in verifying recording of information on a record carrier, comprising:
   a record carrier for storing information, said record carrier being transformable from a first state to a second state;
   means for providing an information signal, said information signal having a first portion having a first signal value and a second portion having a second signal value different from said first signal value;
   means, responsive to said information signal having said second signal value, for transforming said record carrier from said first state to said second state, wherein said record carrier generates a verification signal during transformation from said first state to said second state;
   means for detecting said verification signal during transformation of said record carrier from said first state to said second state; and
   means for comparing said second portion of said information signal and said verification signal to verify recordation of said second portion of said information signal on said record carrier.

2. An apparatus, as claimed in claim 1, wherein:
   said record carrier is an optical record carrier.

3. An apparatus, as claimed in claim 2, wherein:
   said first state is reflective and said second state is non-reflective.

4. An apparatus, as claimed in claim 2, wherein:
   said first state is non-reflective and said second state is reflective.

5. An apparatus, as claimed in claim 1, wherein:
   said information signal is a binary signal.

6. An apparatus, as claimed in claim 2, wherein:

said means for transforming including a laser for generating a laser beam to transform said record carrier from said first state to said second state.

7. An apparatus as claimed in claim 6, wherein:
said verification signal produced by said record carrier during transformation of said record carrier from said first state to said second state is a reflection of said laser beam by said record carrier.

8. An apparatus, as claimed in claim 1, wherein:
said second signal value of said information signal has a first polarity.

9. An apparatus, as claimed in claim 8, wherein:
said verification signal produced by said record carrier during transformation of said record carrier from said first state to said second state has a second polarity opposite from said first polarity.

10. An apparatus, as claimed in claim 9, wherein:
said means for comparing includes polarity means for transforming one of the following: said second level of said information signal from said first polarity to said second polarity and said verification signal from said second polarity to said first polarity.

11. An apparatus, as claimed in claim 8, wherein:
said verification signal produced by said recording means during transformation from said first state to said second state has said first polarity.

12. An apparatus, as claimed in claim 1, wherein:
said means for detecting has a bandwidth less than said information signal.

13. An apparatus for use in verifying recording of information on a record carrier, comprising:
a record carrier for storing information, said record carrier being transformable from a first state to a second state;
means for providing an information signal, said information signal having a first portion having a first signal value and a second portion having a second signal value different from said first signal value and a first polarity;
means, responsive to said information signal having said second signal value, for transforming said record carrier from said first state to said second state, wherein said record carrier generates a verification signal having a second polarity opposite said first polarity during transformation of said record carrier from said first state to said second state;
means for detecting said verification signal during transformation of said record carrier from said first state to said second state;
means for changing one of the following: said second portion of said information signal from said first polarity to said second polarity and said verification signal from said second polarity to said first polarity; and
means for comparing said second portion of said information signal and said verification signal to verify recordation of said second portion of said information signal on said record carrier.

14. An apparatus for use in verifying recording of information on a record carrier, comprising:
a record carrier for storing information, said record carrier being transformable from a first state to a second state;
means for providing an information signal, said information signal having a firs portion having a first signal value and having a second portion having a second signal value different from said first signal value and a first polarity;
means, responsive to said information signal having said second signal value, for transforming said record carrier from said first state to said second state, said means for transforming being in a first condition for permitting said record carrier to remain in said first state and being in a second condition for transforming said record carrier from said first to said second state; wherein said record carrier produces a first signal having a second polarity opposite said first polarity during said transformation of said record carrier from said first state to said second state and a second signal having said first polarity immediately after said transformation from said first state to said second state when said means for transforming returns from said second condition to said first condition;
means for detecting said first signal during transformation of said record carrier from said first state to said second state, said means for detecting having an insufficient bandwidth to detect said second signal immediately following said transformation of said record carrier from said first state to said second state;
means for changing one of the following: the polarity of said information signal from said first polarity to said second polarity and the polarity of said first signal from said second polarity to said first polarity; and
means for comparing said second portion of said information signal and said first signal to verify recordation of said second portion of said information signal on said record carrier.

15. An apparatus for use in verifying recording of information on an optical record carrier, comprising:
an optical record carrier for storing information, said optical record carrier being transformable between a non-pitted, reflective state and a pitted, non-reflective state;
means for providing a binary information signal, said binary information signal having a first portion having a first signal value, a second portion having a second signal value different from said first signal value and a first polarity;
a laser, responsive to said information signal having said second value, for transforming said record carrier from said non-pitted, reflective state to said pitted, non-reflective state, wherein said optical record carrier produces a firs signal having a second polarity opposite said first polarity during transformation of said optical record carrier rom said non-pitted reflective state to said pitted, non-reflective state;
means for detecting said first signal;
means for changing the polarity of said first signal from said second polarity to said first polarity; and
means for comparing said second portion of said information signal to said first signal to verify recordation of said second portion of said information signal on said record carrier.

16. A method for use in verifying recording of information on a record carrier, comprising:
transforming a record carrier from a first state to a second state in response to a transition in an information signal from a first signal value to a second signal value different from said first signal value;

detecting a verification signal produced by said record carrier during said step of transforming; and comparing said second signal value of said information signal and said verification signal to verify recordation of said second signal value of said information signal on said record carrier.

17. A method, as claimed in claim 16, wherein:
said record carrier is an optical record carrier.

18. A method, as claimed in claim 17, wherein:
said step of transforming includes using a laser to transform said optical record carrier from said first state to said second state.

19. A method, as claimed in claim 16, wherein:
said information signal has a first polarity and said verification signal has a second polarity opposite from said first polarity.

20. A method, as claimed in claim 19, wherein:
said step of comparing includes changing one of the following: said first polarity of said information signal to said second polarity and said second polarity of said verification signal to said first polarity.

21. A method for use in verifying recording of information on a record carrier, comprising:
transforming a record carrier from a first state to a second state in response to a transition of an information signal from a first signal value to a second signal value different from said first signal value, said information signal having a first polarity;

detecting a verification signal produced by said record carrier during said step of transforming, said verification signal having a second polarity opposite said first polarity;

changing one of the following: said first polarity of said information signal to said second polarity and said second polarity of said signal to said first polarity; and comparing said second signal value of said information signal and said verification signal to verify recordation of said second signal value of said information signal on said record carrier.

22. A method for use in verifying recording of information on a record carrier, comprising:

transforming a portion of a record carrier from a first state to a second state in response to a transition of an information signal from a first signal value to a second signal value different from said first signal value, said information signal having a first polarity, wherein said record carrier produces a first signal having a second polarity opposite from said first polarity during said step of transforming and a second signal having said first polarity immediately following said step of transforming;

detecting said first signal produced by said record carrier during said step of transforming using a detector having an insufficient bandwidth to detect said second signal;

changing one of the following: said first polarity of said information signal to said second polarity and said second polarity of said first signal to said first polarity; and comparing said second signal value of said information signal and said first signal to verify recordation of said second signal value of said information signal on said record carrier.

23. A method for use in verifying recording of information on a record carrier, comprising:
transforming an optical record carrier from a non-pitted, reflective state to a pitted, non-reflective state in response to a transition of a binary information signal having a first polarity from a first signal value to a second signal value different from said first signal value, using a laser, wherein said optical record carrier produces a first signal having a second polarity opposite said first polarity during said step of transforming;

detecting said first signal produced by said record carrier during said step of transforming;

changing one of the following: said first polarity of said binary information signal to said second polarity and said second polarity of said first signal to said first polarity; and comparing said second signal value of said binary information signal and said first signal to verify recordation of said second signal value of said binary information signal on said record carrier.

* * * * *